United States Patent [19]

Wheeler et al.

[11] 4,257,321

[45] Mar. 24, 1981

[54] PRESSES

[76] Inventors: Rowland G. Wheeler; Rodney Wheeler, both of Hoppins, Dunchideock, Exeter, Devon, England

[21] Appl. No.: 59,499

[22] Filed: Jul. 23, 1979

[51] Int. Cl.³ .......................................... B30B 15/06
[52] U.S. Cl. ................................... 100/219; 99/456; 100/268; 100/240
[58] Field of Search ............... 100/219, 268, 126, 127, 100/274, 204, 240; 425/419; 99/351, 456

[56] References Cited

U.S. PATENT DOCUMENTS

| 99,228 | 1/1870 | Patten et al. | 100/219 X |
|---|---|---|---|
| 185,124 | 12/1876 | Murphy | 100/268 |
| 1,165,223 | 12/1915 | Butz | 99/351 |
| 1,239,652 | 9/1917 | Wickham | 100/219 |
| 1,960,964 | 5/1934 | Wilde | 99/351 |
| 2,399,857 | 5/1946 | Connors | 100/219 |
| 2,425,727 | 8/1947 | Butz | 99/351 |
| 2,553,035 | 5/1951 | Burrell et al. | 100/219 |

FOREIGN PATENT DOCUMENTS 420325 11/1934 United Kingdom .
652529 4/1951 United Kingdom .

*Primary Examiner*—Billy J. Wilhite

[57] ABSTRACT

A press suitable for making cheese comprises a pressure assembly which is displaceable along guides projecting from the base of the press towards or away from a reaction yoke member formed by the base, the pressure assembly being constituted by first and second members which are resiliently biassed away from each other. Friction catches are provided which, in an operative position, frictionally engage the guides to resist displacement of the pressure assembly away from the reaction member.

9 Claims, 3 Drawing Figures

PRESSES

BACKGROUND OF THE INVENTION

The present invention relates to presses, and particularly to a simple press suitable for cheese making and having latching means for holding the press in a pressure applying position to which it can be moved manually.

Many different forms of presses are known for applying a wide range of operating pressures: most known presses are either screw operated or hydraulically operated, but they all have the common disadvantage of being complex and expensive. Moreover, for applications involving foodstuffs known such presses are also difficult to keep entirely clean: this latter is of particular importance since contamination of foodstuffs must be rigorously avoided.

In the above exemplary application for presses of the present invention, that is in the manufacture of cheese, the press is ued to remove the whey from curds produced when milk and milk products are treated with appropriate baccilli at controlled temperatures. The degree of pressure exerted at this stage in the cheese making process has an important effect on the type of cheese produced, the greater pressure providing harder cheeses. Although screw operated or hydraulically operated press have in the past been used for this purpose, the complexity of their component parts does make it difficult for them properly to be maintained sterile. Absolute sterility is an essential requirement since infection of the curd during the cheese making process with baccilli other than that or those with which the curd is deliberately impregnated will modify the characteristics of the eventual cheese thereby spoiling the process. Another factor influencing the cheese making process is the fact that when the curds and whey are initially compressed, the resistance to compression does not remain constant, but reduces as the whey is gradually expelled from the curd. Since this is a relatively slow process, it is necessary to adjust the pressure at regular intervals over a relatively long time. This involves continual supervision.

OBJECT OF THE INVENTION

It is the object of the present invention to provide a press which, in addition to being simple and therefore easily maintained sterile (and also economical to produce), is able to accommodate a change in volume of the material being pressed in order to maintain pressure on the article being pressed.

SUMMARY OF THE INVENTION

The present invention, in one aspect, provides a press comprising a pressure member, a reaction member formed by the base of the press, and guides projecting from said base along which the pressure member is displaceable, in which there are provided friction latching means which, in an operative position, are operable to resist the displacement of the pressure member away from the reaction member while permitting displacement of the pressure member towards the reaction member.

In another aspect the present invention provides a press comprising a pressure assembly displaceable along guides projecting from the base of the press towards or away from a reaction member formed by said base, the pressure assembly comprising first and second pressure members resiliently biased away from one another, the first pressure member lying between the second pressure member and the reaction member along the guide, and the second pressure member being provided with a friction latching mechanism which, in an operative position is operable to resist displacement of the pressure assembly away from the reaction member.

Thus, when set, the pressure assembly is itself stressed with the first and second pressure members being in a position where they stress the resilient biasing means so that any change in the volume of the material being pressed by the press is accommodated by displacement of the first pressure member under the action of the resilient biasing means, the second pressure member being latched in position on the guides.

Preferably the latching mechanism is one which engages automatically in the latched position without requiring any manual or other displacement in order to effect latching. In the preferred embodiment the latching mechanism includes a catch element for the or each guide, the or each catch element being rockable and having an operative position in which it frictionally engages the guide in such a way that relative movement between the catch element and the guide in one direction reinforces the engagement to jam or wedge the element and the guide agains further movement, and relative movement in the opposite direction frees the catch element to permit such movement to continue.

In the preferred embodiment of the invention the press is adapted for operation in such a position that the guides are generally upright with the pressure assembly displaceable up and down along them, and the catch elements are retained in their operative position by gravity so that they automatically adopt the latching position as the pressure assembly is pressed down onto anything positioned between the pressure assembly and the reaction member.

The catch element may be provided with an aperture through which the guide passes and the sides of which engage against the surface of the guide to jam or wedge the catch when it is in its operative position: in this case the catch element is preferably a substantially flat plate which rests on a support which displaces one edge or side of the plate away from the surface of the pressure member on which it is carried, when in the operative position thereof.

In the preferred embodiment of the invention there are two substantially parallel guides and the pressure assembly comprises a first yoke extending transverse the two guides and engaged thereon for displacement towards or away from the reaction member, and a second yoke also guided on the guides and resiliently biased away from the first yoke, the second yoke carrying the said catch element.

The catch elements may be plates which rest on the said second yoke, one end of each plate forming a catch element resting on a raised projection carried by the yoke, and the other end of the plate having the said aperture through which the guide passes.

In the preferred embodiment of the invention the aperture in each catch plate is constituted by a generally cylindrical hole the axis of which is inclined with respect to the normal to the plane of the plate, the mouth at each end of the hole being enlarged in a direction lying in a plane including the axis of the generally cylindrical hole and the normal to the plane of the plate in such a way as to permit the plate to rock about an axis perpendicular to this plane.

Other features and advantages of the present invention will become apparent from a consideration of the following description, with reference to the accompanying drawings, of a preferred embodiment, which is provided by of nonrestrictive example.

DESCRIPTION OF THE PREFERRED EMBODIMENT

Figure 1:
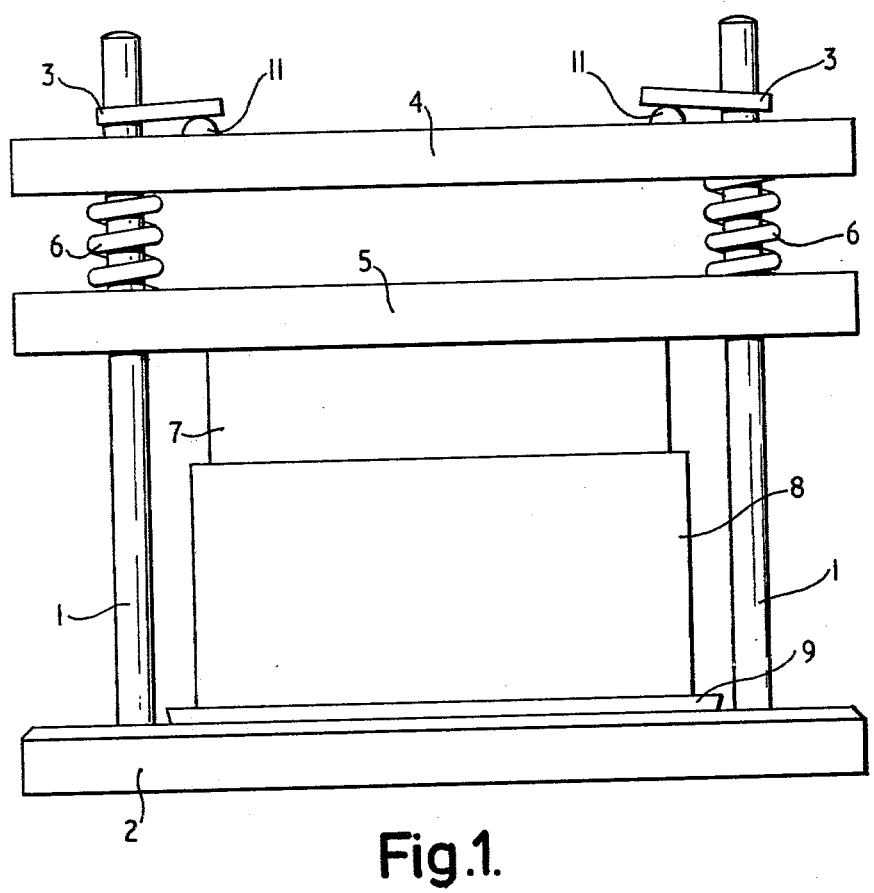
FIG. 1 is a schematic side view of the embodiment.
Figure 2:
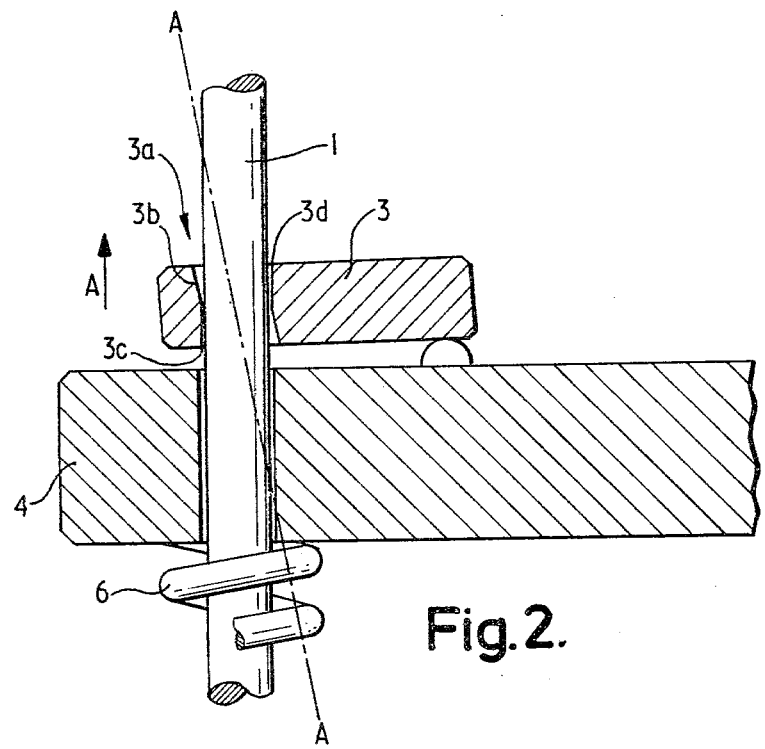
FIG. 2 is an enlarged sectional view of a part of the embodiment showing a catch element in its operative position.
Figure 3:
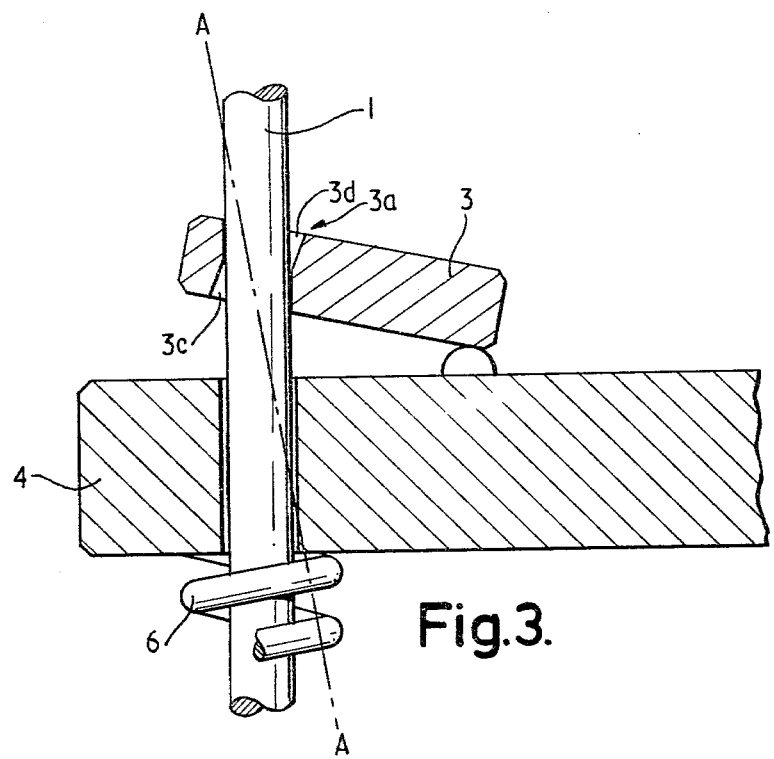
FIG. 3 is an enlarged sectional view of part of the embodiment showing the catch element in a release position.

FIGS. 1, 2 and 3 illustrate a press which comprises a base 2 from which project upwardly two parallel guides 1. The base 2 forms a reaction member with respect to which pressure can be applied by acting on the guides 1 in a manner which will be described in greater detail below.

Slidably mounted on the guides 1 is a pressure assembly comprising a first yoke 5 and a second yoke 4 each of which have two apertures through which the guides 1 pass. Between the yokes 4 and 5, and surrounding the respective guides 1 are compression springs 6 which act to urge the first and second yokes away from one another.

The normal operating position of the press would be with the base 2 resting on a substantially flat generally horizontal surface so that the guides 1 project substantially vertically. Resting on the upper or second yoke 4 are two catch elements 3 each of which is in the form of a rectangular plate having a single aperture 3a passing therethrough. The aperture 3a is generally circular in plan, and has a generally cylindrical side wall 3b having an axis, inclined to the normal to the plate 3, and indicated by the broken line A—A. The mouth, at each end of the aperture 3a is flared outwardly at points 3c and 3d respectively. The outwardly flared portions 3c and 3d extend from approximately the middle of the thickness of the plate 3, and are located on diametrically opposite sides of the hole with the flared portion 3c being directed towards the upper face of the plate 3 and flared portion 3d approaching the lower face of the plate 3. The flared portions 3c, 3d are centred on a plane which includes the axis A—A and the normal to the plate 3.

Each of the plates 3 is supported on the second yoke 4 and spaced slightly therefrom by a spacing element 11 which is located adjacent a guide 1. The height of the spacing element 11 is related to its distance from the adjacent guide 1 and to the angle of inclination of the flared portions 3c, 3d of the apertures 3a in the plates 3 in such a manner that, as more clearly shown in FIG. 2, each plate 3 rests on the support 11 about which it rocks to a position where the sides of the hole 3a jam against the guide 1. In this position, termed a first or jamming position, the plate 3 is solely supported by the projection 11 and the engagement of the sides of the hole 3a with the guide 1. The plate 3 projects slightly over the edge of the yoke 4 to enable the plate 3 to be raised manually to the position shown in FIG. 3 termed a second or free position, where the guide 1 enters the flared portions 3c, 3d so that it is free to move in either direction through the hole 3a.

As will be appreciated, in the position shown in FIG. 2, the catch plates 3 jam against the guides 1 so that any force applied upwardly, that is in the direction of the arrow A of FIG. 2 will tend to increase the force of engagement between the plate 3 and the guide 1 thereby securely jamming or wedging the two members together. If, on the other hand, a force is applied to the yoke 4 downwardly, that is in the direction opposite that of the arrow A, the plate 3 can be turned clockwise or anticlockwise as seen in FIGS. 2 and 3 thereby permitting the plate 3 to slide down the guide 1. On release of the force on the yoke 4, however, the plate 3 re-adopts the operative position shown in FIG. 2 where it jams against the guide 1 and prevents the yoke from being displaced upwardly. Lifting the projecting edges of the plates 3, however, will free the jamming action and permit the yoke 4 to be moved up or down the guides 1 in either direction.

In use of the press a shallow tray 9 is placed on the base 2 and carries a container 8 which is filled with the material, such as cheese curd, to be compressed. A follower 7 which fits the container 8 like a piston is then superimposed on the curd and the pressure assembly lowered until the first or lower yoke 5 engages the upper surface of the follower. Pressure is then exerted on the upper or second yoke 4 to compress the spring 6 and exert the required pressure on the follower 7, compressing the contents of the container 8 to the required degree. When the pressure is released from the uper yoke 4 the jamming plates 3 are in the operative position illustrated in FIG. 2 and therefore resist any upward movement of the yoke 4. As whey is expelled from the container 8 the contents of this container reduce in volume and this change is accommodated by extension of the springs 6 which urge the first or lower yoke 5 downwardly onto the follower 7.

Although, as shown in FIG. 3, the catch plates 3 can be simply raised to release the pressure assembly they may alternatively be turned about an axis parallel to the guides 1, which are preferably in the form of rods, to a position where they disengage from the spacing elements 11 which are in the form of studs and lie flat on the yoke 4 in a position where they exert no influence on the movement of the yoke 4.

We claim:

1. A press comprising: a pressure assembly including at least one yoke, a base forming a reaction member, and guides projecting from said base along which said yoke is displaceable, the improvement comprising, at least one catch element slidable on and rockable relative to a respective said guide when assuming a first position in which said catch element jams against said guide and is held by friction against said guide, when a force is applied to said catch element by said yoke upon displacement of the yoke away from said base, said catch element thereby resisting said displacement of said yoke away from said base, while permitting displacement of said yoke towards said base when assuming a second position, the said catch element contacting and bearing against a part of said yoke in at least the first said catch position.

2. A press as defined in claim 1, wherein said at least one catch element comprises a plate which rests on said yoke and has an aperture through which passes one of said guides along which said yoke is displaceable.

3. A press comprising: a pressure assembly constituted by first and second yoke members resiliently biased away from one another; a base forming a reaction member, and guides projecting from said base along which said pressure assembly is displaceable towards or away from said reaction member, said first yoke lying between said second yoke and said reaction member along said guides, the improvement comprising, said second yoke being provided with a respective catch element for each said guide, each said catch element being slidable on and rockable relative to the respective said guide into a first position in which said catch element frictionally engages the guide to prevent relative movement between said catch element and said guide in one direction, thereby resisting displacement of said pressure assembly away from said reaction member, while relative movement in the opposite direction rocks said catch element and causes it to assume a second position to permit sliding thereof relative to said guide.

4. A press as defined in claim 3, wherein each said catch element has an aperture through which said guide passes and the sides of which engage against the surface of the guide to jam said catch element when in its said first position.

5. A press as defined in claim 3, wherein each said catch element is a substantially flat plate which rests on a support on said second yoke and is biased to said first position by gravity when said press is in a normal, upright position.

6. A press as defined in claim 5, wherein each said plate constituting each said catch element occupies said first position when there is no relative movement between said second yoke and said guides, and is rocked to the second, release position by engagement of said guides with said aperture in each said plate when said pressure assembly is displaced towards said reaction member.

7. A press as defined in claim 3, wherein there are two substantially parallel guides, and wherein said pressure assembly comprises a first yoke extending transverse to said guides and engaged thereon and a second yoke resiliently biased away from said first yoke and carrying said catch elements.

8. A press as defined in claim 7, wherein said catch elements are constituted by respective plate which rest on said second yoke, and wherein a raised projection is upstanding from said second yoke, one end of each said plate resting on a respective said projection and the other end of each said plate having said aperture through which said guide passes.

9. A press as defined in claim 8, wherein said aperture in each said catch plate is constituted by a generally cylindrical hole having an axis which is inclined with respect to the normal to the plane of said plate, each end of said hole being enlarged in a direction lying in a plane including the axis of said generally cylindrical hole and said normal to the plane of said plate so as to permit said plate to rock about an axis perpendicular to this plane.

* * * * *